United States Patent
Vance et al.

(10) Patent No.: US 12,473,102 B2
(45) Date of Patent: Nov. 18, 2025

(54) SATELLITE SYSTEM WITH ORBITAL DEBRIS AVOIDANCE

(71) Applicant: ARIZONA BOARD OF REGENTS ON BEHALF OF THE UNIVERSITY OF ARIZONA, Tucson, AZ (US)

(72) Inventors: Leonard Vance, Tucson, AZ (US); Jose Maria Fernandez Moreno, Tucson, AZ (US); Jekan Thangavelautham, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 185 days.

(21) Appl. No.: 18/281,474

(22) PCT Filed: Mar. 11, 2022

(86) PCT No.: PCT/US2022/020045
§ 371 (c)(1),
(2) Date: Sep. 11, 2023

(87) PCT Pub. No.: WO2022/192735
PCT Pub. Date: Sep. 15, 2022

(65) Prior Publication Data
US 2024/0150044 A1    May 9, 2024

Related U.S. Application Data

(60) Provisional application No. 63/159,945, filed on Mar. 11, 2021.

(51) Int. Cl.
*B64G 1/68* (2006.01)
*B64G 1/24* (2006.01)

(52) U.S. Cl.
CPC ............ *B64G 1/68* (2013.01); *B64G 1/2429* (2023.08)

(58) Field of Classification Search
CPC ................................ B64G 1/68; B64G 1/2429
See application file for complete search history.

(56) References Cited

U.S. PATENT DOCUMENTS

| | | | |
|---|---|---|---|
| 8,511,614 B2 * | 8/2013 | Robinson | B64G 1/1085 244/158.4 |
| 8,833,702 B2 * | 9/2014 | Briskman | G01S 7/003 244/158.6 |

(Continued)

OTHER PUBLICATIONS

International Search Report and Written Opinion from corresponding PCT Appln. No. PCT/US22/20045, dated Jun. 15, 2022. 10 pages.

(Continued)

*Primary Examiner* — Donald J Wallace
*Assistant Examiner* — Jalal C Coduroglu
(74) *Attorney, Agent, or Firm* — Grossman, Tucker, Perreault & Pfleger, PLLC; Edmund P. Pfleger

(57) ABSTRACT

The present disclosure provides a satellite system with orbital debris avoidance. In one embodiment, the satellite system includes debris sensor circuitry to scan orbital debris items in an orbital debris field; and sensor controller circuitry to determine a search window within the orbital debris field based on, at least, uncertainties associated with a velocity of the satellite (Vsatellite) and uncertainties associated with a velocity of at least one debris item (Vdebris), the sensor controller circuitry also to control the debris sensor circuitry to detect the at least one debris item within the search window.

24 Claims, 5 Drawing Sheets

(56) References Cited

U.S. PATENT DOCUMENTS

| | | | | |
|---|---|---|---|---|
| 9,189,451 | B1* | 11/2015 | Freedman | H04N 23/80 |
| 2008/0033648 | A1* | 2/2008 | Kelly | B64G 1/66 |
| | | | | 701/301 |
| 2010/0049440 | A1* | 2/2010 | Alfano | G08G 9/02 |
| | | | | 701/301 |
| 2013/0292517 | A1* | 11/2013 | Briskman | B64G 1/2429 |
| | | | | 244/158.8 |
| 2017/0096242 | A1* | 4/2017 | Alfano | B64G 1/244 |
| 2020/0271749 | A1* | 8/2020 | Wu | G01S 5/0278 |
| 2022/0380068 | A1* | 12/2022 | Mukae | B64G 3/00 |

OTHER PUBLICATIONS

International Preliminary Report on Patentability from corresponding PCT Appln. No. PCT/US2022/020045, dated Sep. 12, 2023. 9 pages.

Braun, et al., "Operational Support to Collision Avoidance Activities by ESA's Space Debris Office", CEAS Space Journal, 2016, 8:177-189.

Carandente, et al., "New Concepts of Deployable De-Orbit and Re-Entry Systems for CubeSat Miniaturized Satellites", Recent Patents on Engineering, Apr. 2014, vol. 8, No. 1, pp. 2-12.

Chandra, et al., "Advanced Inflatable De-Orbit Solutions for Derelict Satellites and Orbital Debris", Space Traffic Management Conference, 2019, pp. 1-9.

Chandra, et al., "End to End Satellite Servicing and Space Debris Management", Space Traffic Management Conference, 2019. pp. 1-14.

Levit, et al., "Improved Orbit Predictions using Two-Line Elements", Advances in Space Research 47.7, 2011, pp. 1107-1115.

Vance, et al., "Top Level Systems Requirements Analysis for a Ground Cooperative Orbital Debris Avoidance System", 2021 IEEE Aerospace Conference, pp. 1-6.

Vance, et al., "Value Analysis for Orbital Debris Removal", Advances in Space Research 52.4, 2013, pp. 685-695.

Xu, et al., "Orbit Error Characteristic and Distribution of TLE using CHAMP Orbit Data", Astrophysics and Space Science 363.2, 2018, pp. 1-6.

The NASA Orbital Debris Office Webpage, downloaded Feb. 13, 2024 from https://www/orbitaldebris.jsc.nasa.gov/.

"Space Debris by the Numbers", European Space Agency, https://www.esa.int/Safety Security/Space Debris/Space debris by the numbers, Dec. 6, 2023.

* cited by examiner

SATELLITE SYSTEM WITH ORBITAL DEBRIS AVOIDANCE

This application claims the benefit of U.S. Provisional Application Ser. No. 63/159,945, filed Mar. 11, 2021, which is hereby incorporated by reference in its entirety.

STATEMENT OF GOVERNMENT INTEREST

This invention was made with government support under contract 80NSSC19M0197, awarded by The National Aeronautics and Space Administration (NASA). The government may have certain rights in the invention.

TECHNICAL FIELD

The present disclosure relates to a satellite system with orbital debris avoidance.

BACKGROUND

The recent proliferation of low earth satellites in support of global wideband internet communications as well as a growing variety of miniature spacecraft missions has underscored the need for a systems approach to orbital debris mitigation. The Chinese ASAT test of 2007 and the subsequent Iridium/Cosmos collision of 2009 each served as reminders that collisions in low earth orbit are not just of academic concern, but are now a real operational concern. ESA Estimates for the number of objects in low earth orbit greater than 10 cm in size is 34,000, with estimates for smaller but still hazardous 1-10 cm objects at 900,000. The growth of the number of objects in orbit has not been matched by an equivalent improvement in tracking capability. The advent of powerful ground-based radars with the specific intent to track orbital debris (The U.S. Space Fence) vastly improves the ability those objects, but the problem of track file correlations must also be solved before benefits can be fully realized.

The position uncertainty of an orbiting object can exceed 10 kilometers depending on the quality and timing of its most recent tracking sensor. Spread out over such a large volume, the actual probability of impact, even assuming perfect overlap of their respective position uncertainties is so small, and the frequency of occurrence so high, that avoidance maneuvering is often considered not worth the price of the delta-V expended. Nevertheless, the proliferation of launch systems and the advent of various global internet satellite networks has significantly increased the number of objects in orbit, along with the real possibility of collision. Even without considering the resulting loss of costly assets, the resulting cascade of additional debris introduced by such collisions significantly worsens the problem for future operators, leading eventually (over decades to centuries) to the end state of the Kessler syndrome, where the population of lethal debris is so high that low Earth orbit missions as we understand them would not be possible.

Multiple mitigation techniques have therefore been implemented, with the aim of executing activities in support of a systems-based solution to this problem. New satellite launches must now submit debris mitigation plans which demonstrate deorbit within 20 years, and tethering has reduced the population of lens caps and other like deployables from newly commissioned spacecraft. Exploratory missions for debris capture are being planned and improved ground-based radars are being developed to reduce position and velocity uncertainties.

As one part of this solution, spacecraft-based sensors with accompanying thrusters have also been considered. In the absence of any cueing from the ground, these systems scan the spacecraft forward velocity quadrants, and track incoming debris to determine the probability of imminent collision. The immediate problem with such a concept is that a large volume of forward angular space must be continuously scanned for the lifetime of the satellite, which is both a significant mechanical and reliability challenge.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
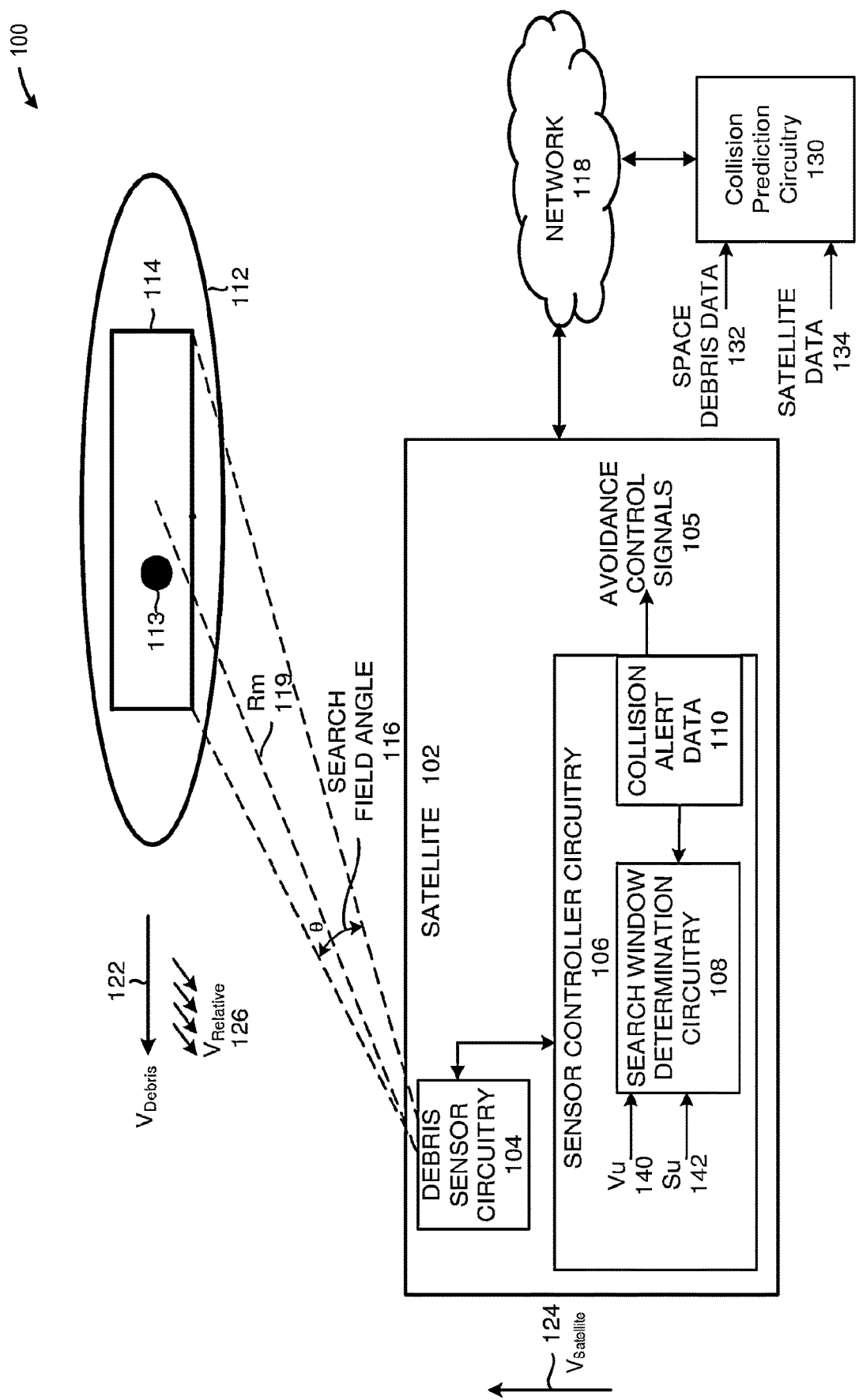
FIG. 1 illustrates a satellite system in accordance with several embodiments of the present disclosure.

FIG. 1 illustrates a satellite system 100 according to several embodiments of the present disclosure. As a general overview, the satellite system 100 is configured to detect orbital debris to enable a satellite to make maneuvering decisions to avoid collisions with debris. The satellite system 100 includes a satellite 102 generally configured to achieve an orbit in an orbital plane, and having a forward velocity of Vsat 124. Although not shown in the drawings, the satellite 102 may include conventional systems that may be associated with a satellite, e.g., propulsion systems, navigation systems, power systems, satellite-to-satellite communications circuitry, satellite-to-ground communications circuitry, etc., and may also include various payload systems to enable the satellite 102 to perform specific tasks, as is well-understood in the art. In embodiments described herein, the satellite 102 includes debris sensor circuitry 104 generally configured to determine the existence or absence of a debris item within a search window 112, and sensor controller circuitry 106 generally configured to control the debris sensor circuitry 104 and to enable activation and positioning of the debris sensor circuitry 104 to detect debris within a defined search window 114, as will be described in greater detail below.

In some embodiments, the debris sensor circuitry 104 may include, for example, a laser device, RADAR device, passive optical elements, etc. and/or combinations thereof. For example, debris sensor circuitry 104 may comprise continuous wave laser circuitry to enable scanning of the search window 114. In one example, a continuous wave laser sensor may be used having a range of at least 20 kilometers (range from the satellite 102 to debris within the search window 114), a power consumption of approximately 55 milliamp hours, and a beamwidth of 50 µrad. Of course, this is only a non-limiting example of the types of sensors that may be used according to the teachings herein. In some embodiments, the debris sensor circuitry 104 may be generally configured to scan an area (search window 114) generally in front of the satellite, and thus, may also be controllable to move and/or point to various positions within the search window 114.

Sensor controller circuitry 106 is generally configured to control the debris sensor circuitry 104 to determine if a debris item 113 is within the search window 112. Sensor controller circuitry 106 includes search window determination circuitry 108 generally configured to determine a size of the search window 114 (e.g., search field angle 116), as described below.

The search window 114 is generally defined within a debris position uncertainty zone 112 ("uncertainty zone 112"). The uncertainty zone 112 generally represents an area within which the position of debris items contained therein have a degree of uncertainty, such that, given these uncertainties, there exists a non-zero probability of collision of a debris item in this zone 112. To determine the size (angular extent) of the uncertainty zone 112, the present disclosure may utilize ground-based collision alert systems. For example, the system 100 may include ground-based collision prediction circuitry 130 generally configured to determine if one or more debris items may collide with the satellite 102. As is known, velocity and position data of space debris may be tracked by various governmental entities (e.g., NORAD, Space Command, etc.) and/or private entities, and such velocity and position data may be stored in a common format, for example a two-line element (TLE) database format, etc. While velocity data associated with each debris item is generally considered highly accurate (e.g., accurate to within 1-10 cm/s, etc.), positional data associated with each debris item tends to be far less accurate, due to, for example, orbital dynamics (e.g., gravitational effects, etc.) that can cause positional changes. Such TLE data (and/or other debris velocity/position data) may be updated continuously (e.g., daily, weekly, etc.) so that the database generally is complete and accurate (with respect to debris velocity data).

Collision prediction circuitry 130 is configured to determine collision alert data based on known space debris data 132 (e.g., TLE data) and satellite data 134. The space debris data 132 may include velocity and/or position data concerning known debris items (Vdebris 122). The satellite data 134 may include velocity data (Vsat 124) of the satellite 102 (and may also include orbital parameters, etc.). To determine a potential collision between a debris item and the satellite 102, the collision prediction circuitry 130 may be configured to model debris behavior and determine potential satellite-crossing paths. In one example embodiment, the collision prediction circuitry 130 may be configured to execute a Simplified General Perturbations 4 (SGP4) model to generate future debris position and velocity based on, for example, earth oblatenessm aerodynamic drag, perturbations of the moon and sun, etc., to determine orbital trajectories and characteristic uncertainties of debris items over a selected time horizon (e.g., days, weeks, months, and/or at times when the satellite 102 will be known to be crossing a known debris field, etc.). This model can propagate errors in state estimates for debris objects to establish debris velocity uncertainties. Of course, this model is provided as an example, and in other embodiments other conventional and/or proprietary debris modelling tools may be used. Because of positional uncertainties of debris items, the collision prediction circuitry 130 defines the uncertainty zone 114, which includes any debris item(s) that may potentially cross paths with the satellite 102. Thus, the uncertainty zone 112 may contain one or more debris items that have a high probability of collision (e.g., 95% confidence, and/or other confidence level), and these items are represented in the collision alert data. The collision alert data may also include the position and extent of the uncertainty zone 112, and an approximate time of collision. The collision alert data may be transmitted to the satellite 102 (via communications network 118), and stored in storage device 110.

The search window determination circuitry 108 is configured to determine the size of search window 114 (or, stated another way, determine the search field angle θ 116) based on uncertainties of Vdebris 122 and Vsat 124 (shown generally as velocity uncertainties Vu 140), uncertainties of pointing errors associated with sensor circuitry 104 (shown generally as sensor uncertainties Su 142), the size of the satellite 102, and also based on the collision alert data 110 (which, as described above, provides the size of the uncertainty zone 112 and the approximate time of a predicted collision event). In one example embodiment the search window determination circuitry 108 may determine the search field angle θ 116 using root-sum-square (RSS) and/or root-mean-square (RMS) functions of the uncertainty in velocity and sensor accuracy. For example, the search window determination circuitry 108 may be configured to execute a root-mean-square function that provides an approximation of angular search uncertainty, for example:

$B = \mathrm{sqrt}\,((Vu/Vm)^2 + (Lsat/6Rm)^2 + (Au)^2)$; where sqrt is a square root function, Vu is the uncertainty of the relative closing velocity (shown as Vrel 126), Vm is the magnitude of the closing velocity, Last is the length (or width) of the satellite (i.e., the dimension exposed to oncoming debris), Rm is the range magnitude to the debris field along the closing velocity vector Vrel 126 (represented as line 119 in FIG. 1 from the debris sensor circuitry 104 to the approximate middle of the search window 114), and Au is the alignment uncertainty of the sensor system relative to a selected coordinate frame (e.g., xy coordinates, polar coordinates, etc.)

With B (the angular search uncertainty), the search window determination circuitry 108 may determine the search field angle θ 116 as:

$\theta = 6B.$

As a general matter, the size of the search window 114 is generally much smaller (e.g., orders of magnitude smaller) than the uncertainty zone 112 generated by the collision prediction circuitry 130, and thus provides a significant advancement over current debris avoidance systems. The sensor controller circuitry 106 may enable the sensor circuitry 104 to scan the search window 114, at the time of a predicted collision event, to determine an existence or absence of a debris item. In some embodiments, sensor controller circuitry 106 may generate sensor movement control signals to control the debris sensor circuitry 104 to in a predetermined pattern within the search window 112. For example, the predetermined pattern may include a left-to-right, top-to-bottom scanning pattern. Depending on, for example, the beamwidth and/or sensitivity of the debris sensor circuitry 104, the sensor controller circuitry 106 may accomplish one or more scans of each debris items in the search window 112.

If, during a scan of the search window 114 a debris item is detected (for example debris item 113) there exists a probability of collision that exceeds probability of collision threshold. Accordingly, the sensor controller circuitry 108 may also be configured to generate avoidance control signal(s) 105. The avoidance control signal(s) 105 may include, for example, propulsion and/or steering instructions to enable the satellite 102 to speed up, slow down and/or change trajectory to avoid collision with the debris item 113. Such instructions may be used by, for example, propulsion and/or guidance systems (not show) associated with the satellite 102.

It should be noted that although the collision prediction circuitry 130 is described above as a ground-based processing platform, the collision prediction circuitry 130 may, in other embodiments, be incorporated within satellite 102, depending on processing requirements, power requirements, etc.

Figure 2:
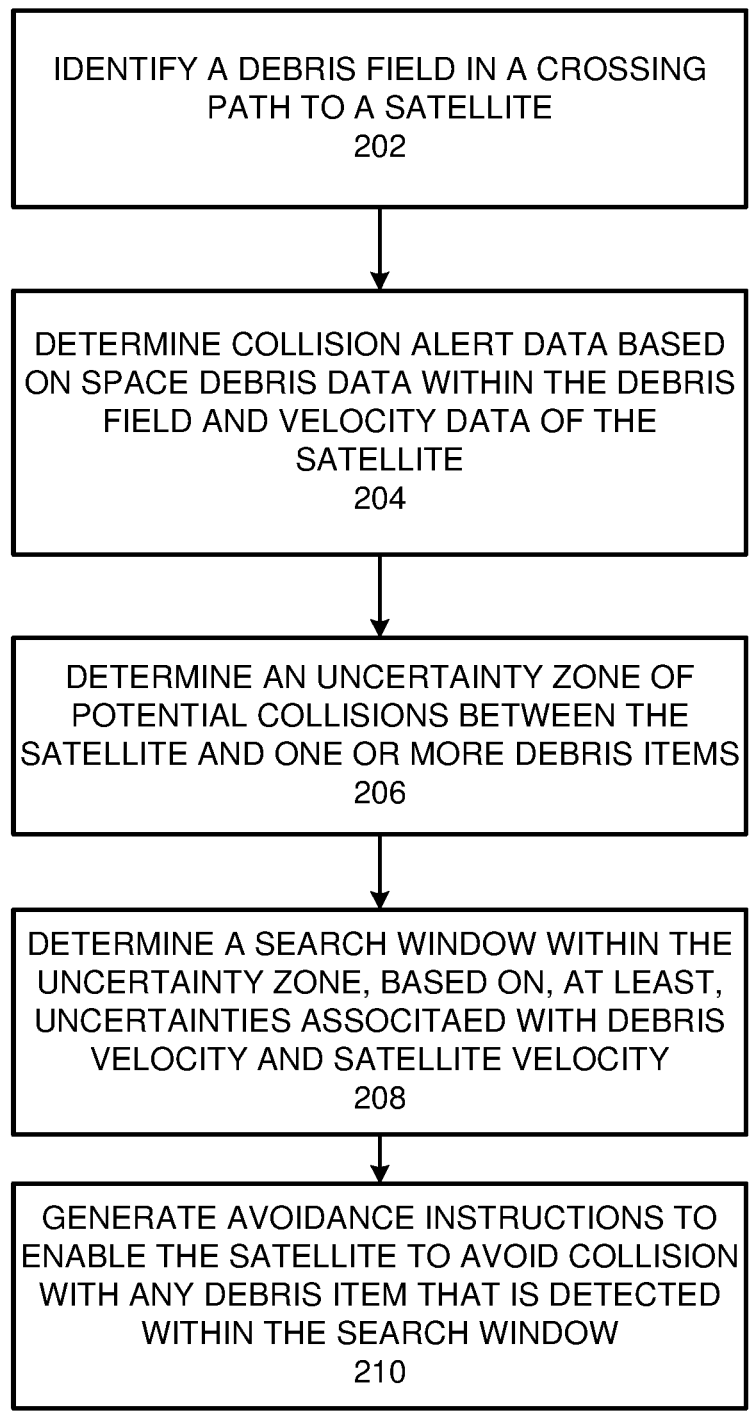
FIG. 2 is a flowchart of operations according to one embodiment of the present disclosure.

FIG. 2 illustrates a flowchart 200 of operations for space debris avoidance according to one embodiment of the present disclosure. Operations of this embodiment include identifying a debris field in a crossing path to a satellite 202. The debris field may be identified using a knowledge base derived from ground-based systems that identify and track debris fields in space. Operations of this embodiment may also include determining collision alert data based on known space debris data within the debris field and velocity data of the satellite 204. Operations may also include determining an uncertainty zone of potential collisions between the satellite and one or more debris items 206. The collision alert data is generally only as accurate as the velocity and/or positional data of the debris and satellite, and thus, the collision alert data may define potential collisions within a collision uncertainty zone. Operations may also include determining a search window within the uncertainty zone, based on, at least in part, uncertainties associated with debris velocity and satellite velocity 208. A size, shape and/or position of the search window within the uncertainty may also be based on uncertainties associated with debris detection circuitry and/or uncertainties associated with a relative velocity between the satellite and at least one debris item. Operations of this embodiment also include generating avoidance instructions to enable the satellite to avoid collision with a debris item that is detected within the search window 210.

While the flowchart of FIG. 2 illustrates operations according to one embodiment, it is to be understood that not all of the operations depicted in FIG. 2 are necessary for other embodiments. In addition, it is fully contemplated herein that in other embodiments of the present disclosure, the operations depicted in FIG. 2, and/or other operations described herein may be combined in a manner not specifically shown in any of the drawings, and such embodiments may include less or more operations than are illustrated in FIG. 2. Thus, claims directed to features and/or operations that are not exactly shown in one drawing are deemed within the scope and content of the present disclosure.

Figure 3:
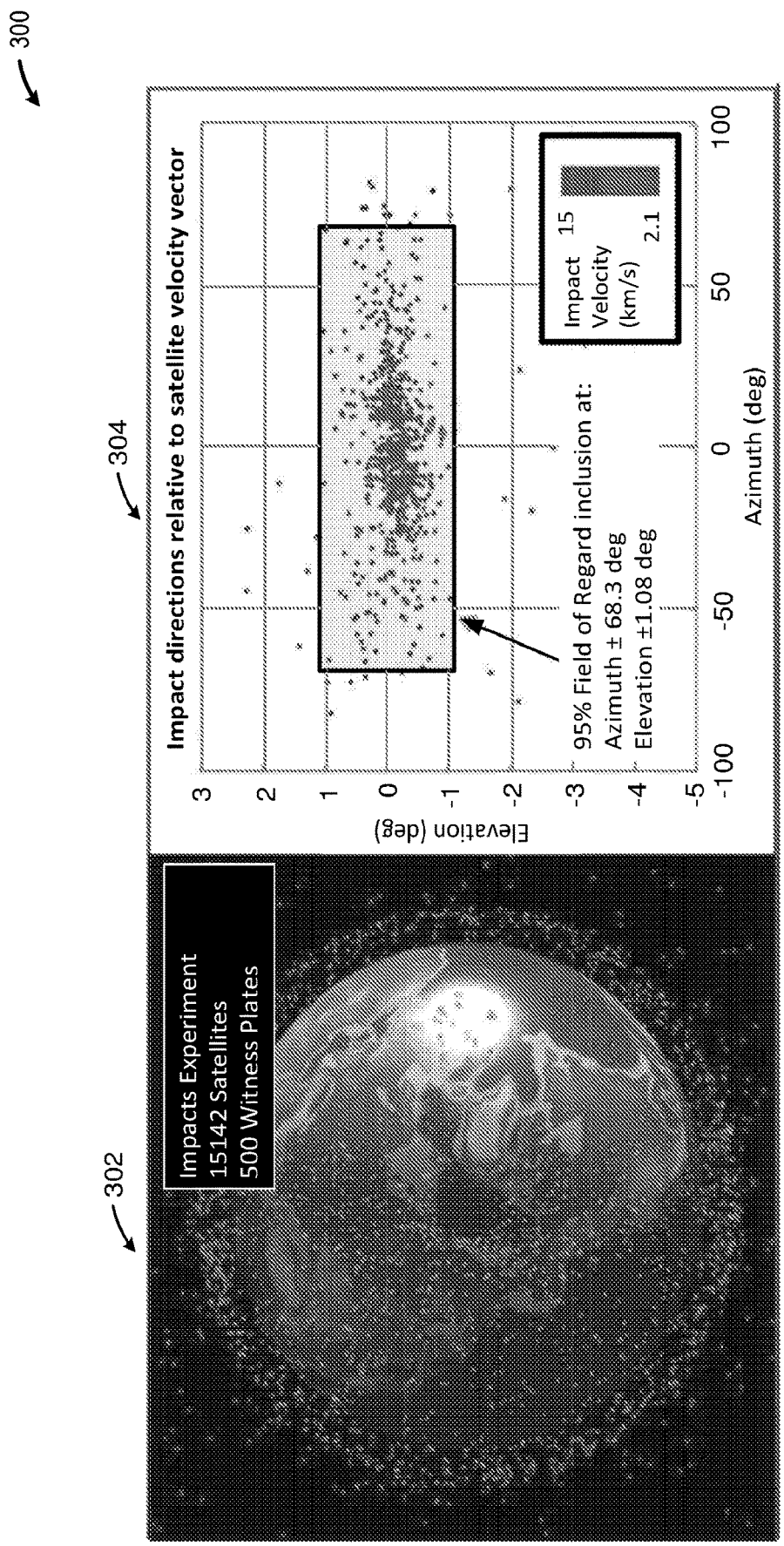
FIG. 3 illustrates an example simulation according to one embodiment of the present disclosure.

FIG. 3 illustrates an example simulation 300 according to one embodiment of the present disclosure. One primary challenge for any satellite based sensor system is the sheer angular volume from which potential debris objects can approach a spacecraft. While the nature of orbital motion largely confines intercepts to the front quadrants along the velocity vector, the range of possibilities is large. Accordingly, characterization of the field of regard necessary to acquire potential collisions is established by constructing a simulation experiment using the position and velocity orbital objects derived from an epoch of the NORAD database, and then adding in a number of 'witness plates', as virtual objects in 880 km circular orbits at 98 degrees inclination. This is illustrated on the left half of FIG. 3, generally shown at 302, depicting numerous orbital objects and numerous "witness plates" dispersed at various locations within the cloud of orbital objects around the Earth. The witness plates are considered stand-in's for a candidate satellite. The witness plates are given a large virtual size, and thereby collect significant numbers of impacts over time in order to establish basic statistics for debris closing velocity and impact angles. The right side of FIG. 3 (304) illustrates the resulting statistics for approach angle and velocity in the right frame. The vast majority of impacts result from azimuth angles less than 70 degrees azimuth angle centered on the satellite's velocity vector, with almost all elevations less than a degree off local horizontal. Velocities averages can be low, but the median velocity is close to 15 km/s as the flux for near head-on collisions is higher because the satellites encounter each other more often. There is therefore a strong correlation between low azimuth angles and high closing velocity.

A sensor field of regard requirement is therefore established as ±68.3 degrees azimuth with ±1.08 degrees elevation. For the purposes of top level requirements derivation, the closing velocity is assumed at 15 km/s as values close to this dominate the distribution. The resulting angular limits do not cover all possible collisions, but represent a compromise covering 95% of the observed cases.

Figure 4:
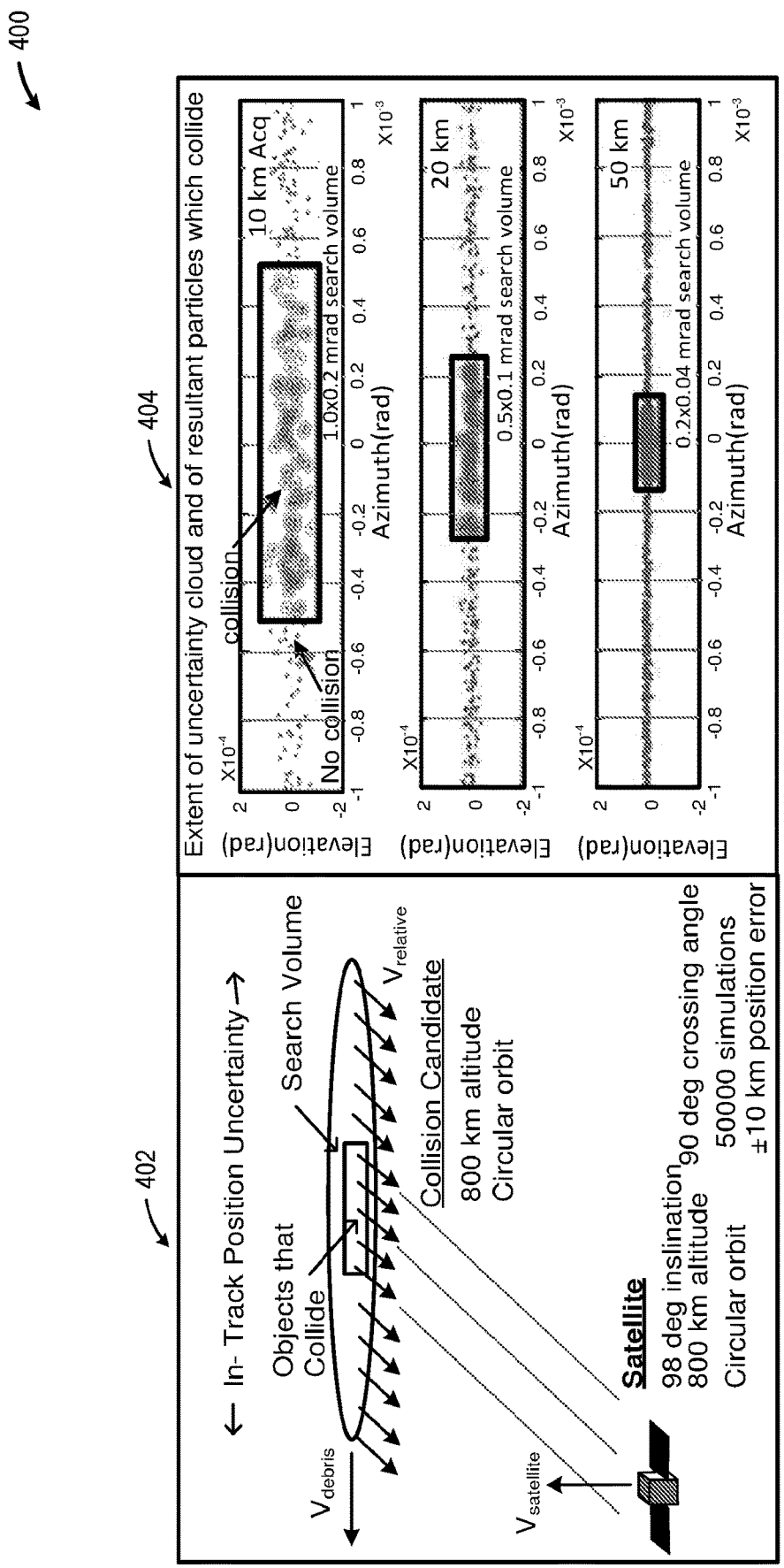
FIG. 4 illustrates another example simulation according to one embodiment of the present disclosure.

FIG. 4 illustrates another example simulation 400 according to one embodiment of the present disclosure. The presumption of this simulation is that the propagation of errors resulting from initial position and velocity covariances result in significant position uncertainties along the direction of travel, but only small increases in the velocity uncertainty itself. As a result, a forward-looking sensor can search along the projected velocity approach vector, ignoring the rest of the uncertainty volume because debris objects, if they are there, will not hit the spacecraft. The underlying assumption is that the velocity uncertainties are much smaller than the position uncertainties leading to this very small required search window.

The resulting propagation of errors over time resulting from an initial state estimate drives the position and velocity uncertainties of a debris object. Since initial state covariances are not readily available for orbital objects, nor included in the standard TLE (Two Line Element) model, state vector covariances are established by propagating a TLE defined orbit for a given satellite forward by several days, and comparing the resulting states to those from a more recent TLE. The propagated position errors of a TLE provides an understanding of how fast these errors grow, and this can be used to infer corresponding initial velocity uncertainties.

The SGP4 (Simplified General Perturbations 4) model takes into account a first cut at earth oblateness, aerodynamic drag, and perturbations of the moon and sun in order to establish future state predictions. Such a model may be used to propagate orbital trajectories and characterize uncertainties over time. This model is used to propagate errors in the state estimates for our debris object for the purpose of establishing velocity uncertainties. Propagated position and velocity uncertainties are then used to establish the uncertainty in the conjunction approach vector (Vrel), which in turn establishes the angular search (search widow angular extent) requirement for our proposed sensor.

This is accomplished by executing a simulation experiment by adding random errors to the initial velocity values derived from a TLE, and propagating forwards in time seven days, and then comparing the resulting position errors to those observed. Velocity uncertainties are then adjusted up or down to match the observed position errors as a function of time, thus inferring the initial velocity estimate error. Variations on this experiment were done by providing a rough estimate of propagated errors for high inclination circular orbits at about 800 km altitude.

Assuming a ±10 km in-track error over 7 days consistent with Propagating with SGP 4, infers an RMS velocity error of 1.8 mm/s in each axis. Assuming that original velocity vector error, a monte-carlo simulation is executed against a nominal intercept point to establish how often collisions actually occur. The angular positions of those that collide relative to the nominal approach vector are then established as a function of range so that search requirements can be established consistent with the acquisition range of the chosen sensor. The left frame of FIG. 4 (402) shows that the angular distribution of colliding objects is actually very small compared to the overall cloud size, with a 20 km acquisition range requiring a search window only 0.5×0.1 mrad in extent to acquire all possible colliding objects (as shown at 404).

The colliding satellite is simulated 50,000 times for this analysis, drawing a velocity uncertainty of 0.0018 m/s RMS in all three axis before being propagated 7 days with the SPG4 orbital propagator. The resulting in-track position error was ±10 km 3σ at the time of the conjunction, consistent with propagation error estimates completed in references. Assuming any miss distance less than 5 m constitutes a hit, this results in 810 impacts out of 50,000 cases for an impact probability of 1.62% assuming the satellite is lined up perfectly to fly through the center of the debris cloud.

Figure 5:
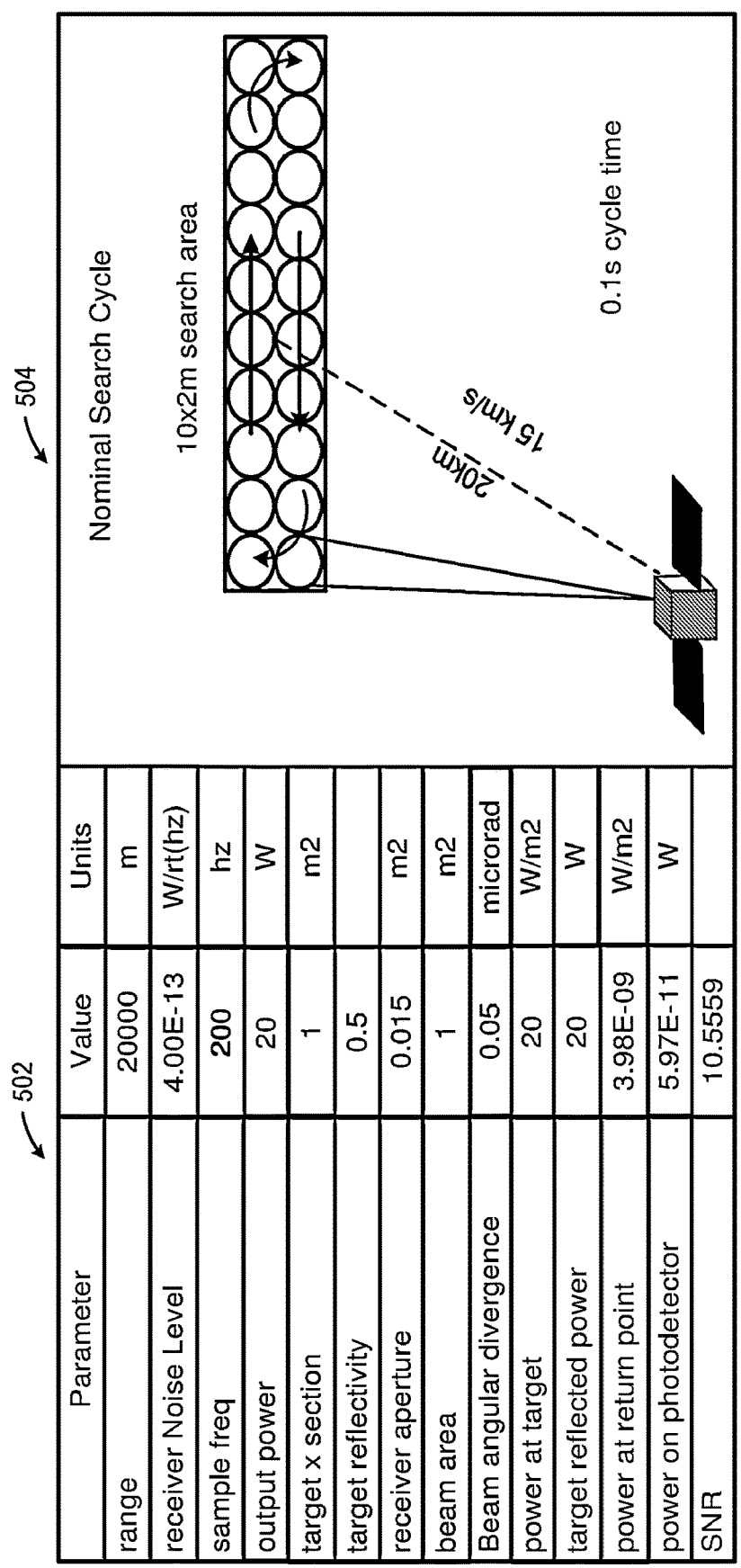
FIG. 5 illustrates another example simulation according to one embodiment of the present disclosure.

FIG. 5 illustrates another example simulation 500 according to one embodiment of the present disclosure. In its simplest form, a forward-looking sensor comprises a continuous wave laser which may be scanned repeatedly over the appropriate search window established in FIG. 4. The sensor remains in standby mode for the vast majority of its time in orbit, only activating upon approach of a possible collision. Power utilization during this phase is about 100 W, assuming a lasing efficiency of 20%, and can be supplemented with a battery if necessary. Battery capacity is 100 W for 2 seconds, or 55 milliamp hours, which is a half gram battery given a 100 Whr/kg Lithium Ion battery energy density estimate.

Any positive detection during the 1-2 second conjunction encounter when the laser is pointing along the approach velocity vector indicates an imminent collision since we are only searching within the angular volume of position uncertainties which will result in an impact. A system trade can occur here, since longer ranges have smaller angular search volumes as well as having longer times to execute an avoidance maneuver. Nominally, 20 km is chosen as the acquisition range, and this permits a beamwidth of 50 μrad which will execute a 10×2 scan over the prescribed angular volume derived in FIG. 4 and as shown in FIG. 5. The selected laser parameters for this simulation are tabulated at 502.

Executing the search path shown in the right frame (504) of FIG. 5 requires an average angular velocity of 1.2 mradians motion at 10 Hz, which calculates to a modest 12 mrad/s.

Propulsive Avoidance

Assuming that we choose 20 km range as a baseline design, and a closing velocity of 15 km/s derived from FIG. 3, we therefore have 1.33 seconds of elapsed time from start of the first scan until impact. With the laser system parameters shown in the left frame of FIG. 5, it can be seen that a complete 10×2 scan can be completed in 100 msec so that the remaining elapsed time for an evasive maneuver is 1.23 seconds. Assuming that a distance of 5 m is required to ensure separation, first order kinematic analysis can be completed to establish propulsive requirements for an evasive maneuver. This shows that the satellite must accelerate at just about 6.6 m/s$^2$ in order to avoid collision worst case.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" may refer to, for example, software, firmware and/or circuitry configured to perform any of the aforementioned operations. Software may be embodied as a software package, code, instructions, instruction sets and/or data recorded on non-transitory, computer-readable storage devices. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, instructions that when executed by circuitry perform the operations. Here, the circuitry may include any of the aforementioned circuitry including, for examples, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A satellite system with orbital debris avoidance, comprising:
    debris sensor circuitry to scan orbital debris items in an orbital debris field; and
    sensor controller circuitry to determine a search window within the orbital debris field based on, at least, uncertainties associated with a velocity of the satellite (Vsatellite) and uncertainties associated with a velocity of at least one debris item (Vdebris), the sensor controller circuitry also to control the debris sensor circuitry to detect the at least one debris item within the search window;
    wherein:
        the search window is defined within a debris position uncertainty zone; and
        the search window is a field angle Θ based on the uncertainties associated with the velocity of the satellite (Vsatellite) and the uncertainties associated with the velocity of the at least one debris item (Vdebris).

2. The satellite system of claim 1, wherein the sensor controller circuitry further to determine the search window based on uncertainties associated with the debris sensor circuitry.

3. The satellite system of claim 1, wherein the sensor controller circuitry further to determine the search window based on a size of the satellite and uncertainties associated with a relative velocity (Vrel) between the satellite and the at least one debris item.

4. The satellite system of claim 1, further comprising collision prediction circuitry to generate collision alert data based on space Vdebris and Vsatellite; wherein the collision alert data includes approximate time of collision between the satellite and the at least one debris item.

5. The satellite system of claim 4, wherein the sensor controller circuitry further to determine the search window based on the collision alert data.

6. The satellite system of claim 1, wherein the sensor controller circuitry further to generate avoidance instructions to avoid a collision between the satellite and at least one debris item based on the detection of the at least one debris item within the search window.

7. The satellite system of claim 1, wherein the sensor controller circuitry also to control the debris sensor circuitry to scan within the search window according to a predefined scan pattern.

8. The satellite system of claim 1, wherein the debris sensor circuitry comprises laser circuitry to detect the at least one debris item.

9. A method for a satellite to identify and avoid space debris, comprising:
    determining, by sensor controller circuitry, a search window within an orbital debris field based on, at least, uncertainties associated with a velocity of the satellite (Vsatellite) and uncertainties associated with a velocity of at least one debris item (Vdebris) within the debris field; and
    controlling, by the sensor controller circuitry, debris sensor circuitry to detect the at least one debris item within the search window;
    wherein:
        the search window is defined within a debris position uncertainty zone; and
        the search window is a field angle θ based on the uncertainties associated with the velocity of the satellite (Vsatellite) and the uncertainties associated with the velocity of the at least one debris item (Vdebris).

10. The method of claim 9, further comprising determining, by the sensor controller circuitry, the search window based on uncertainties associated with the debris sensor circuitry.

11. The method of claim 9, further comprising determining, by the sensor controller circuitry, the search window based on a size of the satellite and uncertainties associated with a relative velocity (Vrel) between the satellite and the at least one debris item.

12. The method of claim 9, further comprising generating, by collision prediction circuitry, collision alert data based on space Vdebris and Vsatellite; wherein the collision alert data includes approximate time of collision between the satellite and the at least one debris item.

13. The method of claim 12, wherein the sensor controller circuitry further to determine the search window based on the collision alert data.

14. The method of claim 9, further comprising generating, by collision prediction circuitry, avoidance instructions to avoid a collision between the satellite and at least one debris item based on the detection of the at least one debris item within the search window.

15. The method of claim 9, further comprising controlling the debris sensor circuitry, by the sensor controller circuitry, to scan the debris items within the search window according to a predefined scan pattern.

16. The method of claim 9, wherein the debris sensor circuitry comprises laser circuitry to detect the at least one debris item.

17. A non-transitory computer readable device including instructions that, when executed by processor circuitry, cause the processor circuitry to perform operations comprising:
    determine a search window within an orbital debris field based on, at least, uncertainties associated with a velocity of the satellite (Vsatellite) and uncertainties associated with a velocity of at least one debris item (Vdebris) within the debris field; and control debris sensor circuitry to detect the at least one debris item within the search window;

wherein:

the search window is defined within a debris position uncertainty zone; and the search window is a field angle θ based on the uncertainties associated with the velocity of the satellite (Vsatellite) and the uncertainties associated with the velocity of the at least one debris item (Vdebris).

18. The non-transitory computer readable device of claim 17 including instructions that, when executed by the processor circuitry, cause the processor circuitry to perform operations further comprising:

determine the search window based on uncertainties associated with the debris sensor circuitry.

19. The non-transitory computer readable device of claim 17 including instructions that, when executed by the processor circuitry, cause the processor circuitry to perform operations further comprising:

determine the search window based on a size of the satellite and uncertainties associated with a relative velocity (Vrel) between the satellite and the at least one debris item.

20. The non-transitory computer readable device of claim 17 including instructions that, when executed by the processor circuitry, cause the processor circuitry to perform operations further comprising:

determine collision alert data based on space Vdebris and Vsatellite; wherein the collision alert data includes approximate time of collision between the satellite and the at least one debris item.

21. The non-transitory computer readable device of claim 20 including instructions that, when executed by the processor circuitry, cause the processor circuitry to perform operations further comprising:

determine the search window based on the collision alert data.

22. The non-transitory computer readable device of claim 17 including instructions that, when executed by the processor circuitry, cause the processor circuitry to perform operations further comprising:

generate avoidance instructions to avoid a collision between the satellite and at least one debris item based on the detection of the at least one debris item within the search window.

23. The non-transitory computer readable device of claim 17 including instructions that, when executed by the processor circuitry, cause the processor circuitry to perform operations further comprising:

control the debris sensor circuitry to scan the debris items within the search window according to a predefined scan pattern.

24. The non-transitory computer readable device of claim 17, wherein the debris sensor circuitry comprises laser circuitry to detect the at least one debris item.

* * * * *